J. C. GIBBS.
ICE CREAM FREEZER.
APPLICATION FILED FEB. 25, 1921.
1,392,412.
Patented Oct. 4, 1921.
2 SHEETS—SHEET 1.
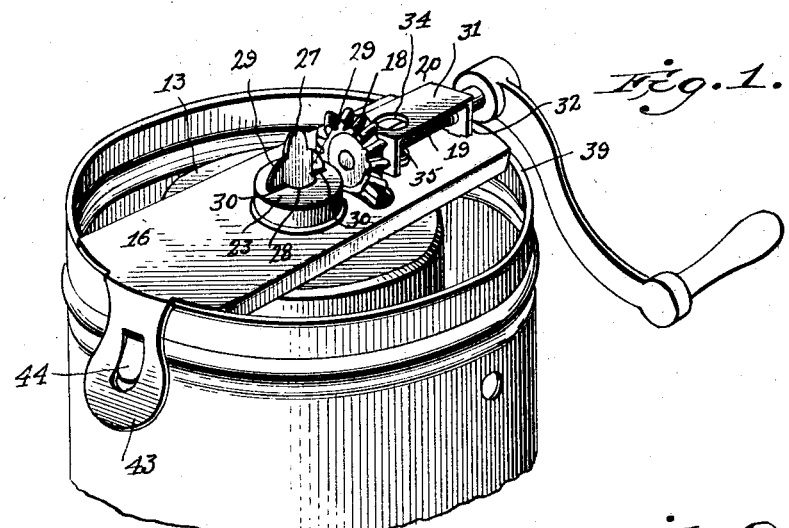
Fig. 1.
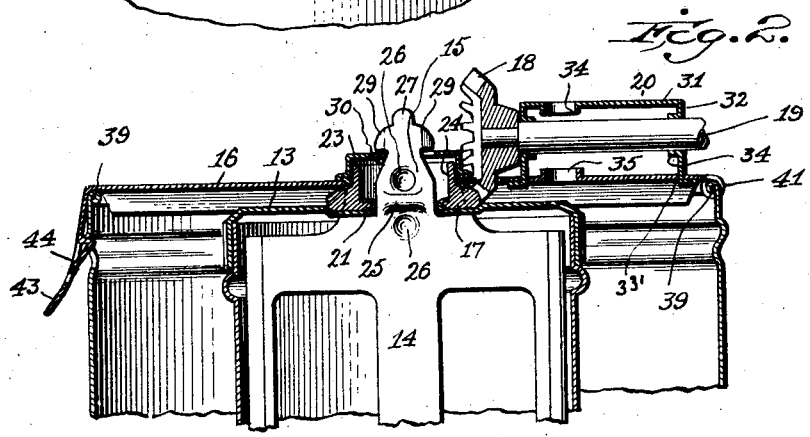
Fig. 2.
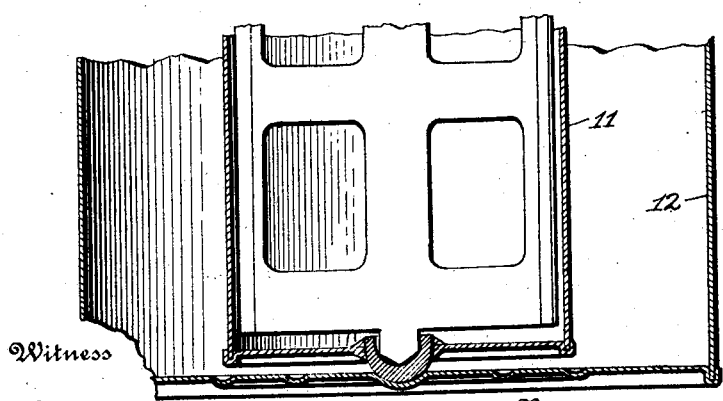
Inventor
John C. Gibbs
Witness
Edwin L. Yewell
By
Davis & Davis
Attorney

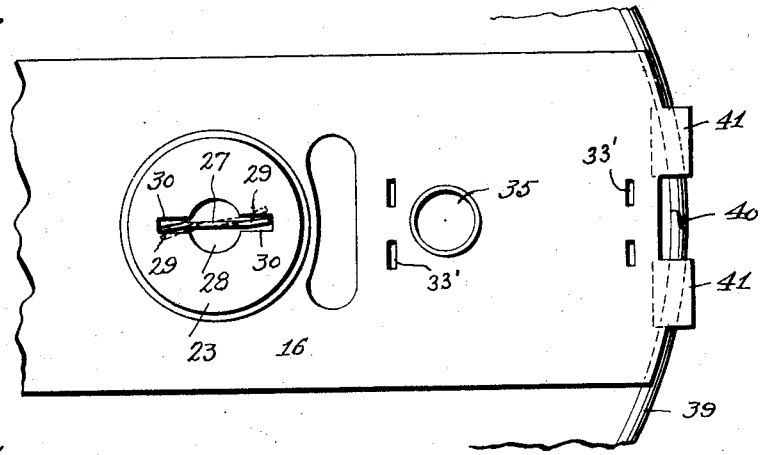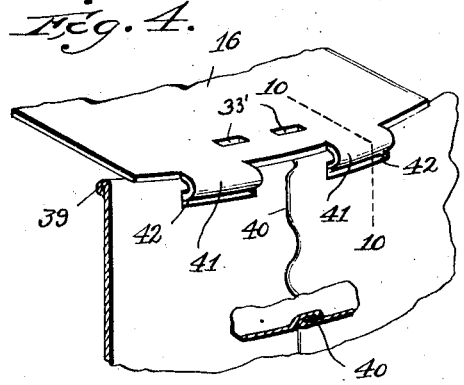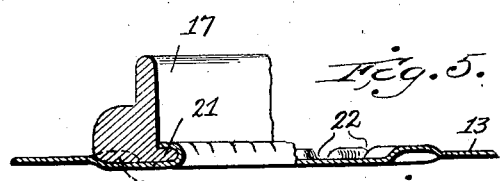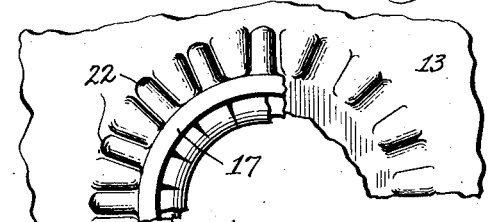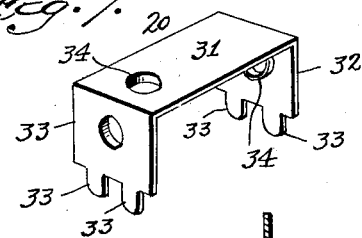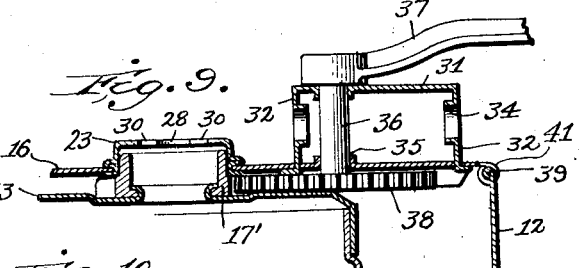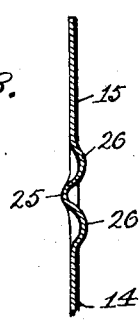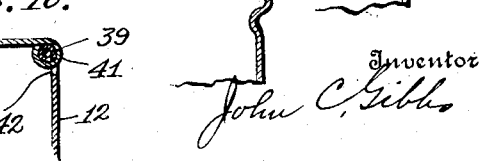

UNITED STATES PATENT OFFICE.

JOHN C. GIBBS, OF LANCASTER, PENNSYLVANIA.

ICE-CREAM FREEZER.

1,392,412.  Specification of Letters Patent.  Patented Oct. 4, 1921.

Application filed February 25, 1921. Serial No. 447,695.

*To all whom it may concern:*

Be it known that I, JOHN C. GIBBS, a citizen of the United States of America, and a resident of Lancaster, county of Lancaster, and State of Pennsylvania, have invented certain new and useful Improvements in Ice-Cream Freezers, of which the following is a full and clear specification.

This invention has relation to improvements in that type of ice-cream freezer covered by my Reissue Patent No. 15,062, dated March 15, 1921, in which the dasher is held stationary while the can is rotated by suitable manually-operable gearing, the driving-shaft of which is journaled upon a bridge hinged to one side of the ice-can so as to be adapted to swing over to one side of the can out of the way while the ice-can and cream-can are being filled or emptied, as more fully hereinafter set forth.

In the drawings—

Figure 1 is a perspective view of the upper part of an ice-cream freezer showing one embodiment of my invention;

Fig. 2 is a vertical transverse sectional view of the freezer shown in Fig. 1;

Figs. 3, 4, 5, 6, 7 and 8 are views of details hereinafter described;

Fig. 9 is a fragmentary vertical sectional view showing a modified arrangement of gearing;

Fig. 10 is a detail vertical sectional view on the line 10—10 of Fig. 4.

Referring to the drawings by reference-numerals, 11 designates the cream-can which is rotatably mounted centrally on the bottom of the ice-can 12 and is provided with a removable cover 13, this cover being locked against rotation on the can in the usual manner. The dasher 14 is desirably made of sheet-metal and is provided with an upstanding anchoring-tongue 15 which extends through a central hole in the can-cover and is locked against rotation by engagement with the sheet-metal bridge-plate 16 in the manner hereinafter set forth.

Affixed to the can-cover is a bevel-gear 17, and meshing with this bevel-gear is a complementary gear 18 affixed to a horizontal shaft 19, this shaft 19 being journaled in a bracket 20 affixed to the bridge-member, said bridge-member being hinged to the can on one side, so as to have the capacity to swing upwardly and to one side out of the way, thereby carrying with it the driving-gear 18 and the drive-shaft 19, to thereby permit access to be had to both the cream-can and the ice-can.

The driven-gear 17 is provided with a broad base which is held firm against the top-face of the can-cover, the can-cover being depressed around the central opening therein to receive this base of the gear. To fasten the gear rigidly to the cover, the sheet-metal edge around the opening in the can-cover is extended upwardly into the hollow gear and crimped down upon an inwardly-extending annular flange 21 formed on the gear; and to further hold the gear against dislodgment from or rotation on the can-cover, I provide the cover with an annular series of indentations 22 which receive the outer ends of the teeth of the gear, thus assisting the crimp clamp in preventing the gear rotating. In this way, I provide for solidly attaching the gear to the can without the necessity of brazing or soldering it thereto.

The bridge-member is provided with a hole midway its length, and affixed to the margin of this hole is an upstanding sheet-metal dome 23 having a straight vertical cylindrical side-wall and a flat top-wall. This dome is affixed to the bridge-plate by crimping its lower edge upon the circular edge of the opening in the bridge-plate. The gear 17 is provided with an upstanding tubular extension 24 which fits within the dome, to thereby form the upper journal of the rotatable cream-can. To prevent the cream-can having any substantial movement upwardly when the bridge-member is in place, the body of the gear is made thick enough to contact with the under face of the bridge-plate when the bridge is in locked, operative, position.

To reinforce the anchoring-tongue 15, especially at the point of its connection with the body of the dasher, where it is subjected to comparatively heavy strain in churning stiff cream, I provide the tongue with suitable corrugations, thereby avoiding the necessity of flanking it with reinforcing plates. The preferred manner of corrugating the tongue is to provide a transverse corrugation 25 near the junction point of the tongue and the dasher, this corrugation being formed by simply indenting the sheet-metal, and to provide two additional circular indentations 26, one above the transverse corrugation 25 and one below it. In practice, I have found that thus indenting the metal in opposite directions greatly increases the strength of the anchoring-tongue.

The anchoring-tongue is provided at its extreme upper end with a tapering tang or ear 27, the purpose of which is to assist in directing the anchoring-tongue through a longitudinal slot in the top-wall of the dome-plate, this slot being enlarged centrally at 28 into circular form. It will be observed that the provision of this tapering centering gear 27 and the central circular hole 28 enables the bridge to be quickly swung down into operative position, as the reduced end 27 may be quickly and easily directed into the central opening 28, and then, by taking hold of this reduced end 27 and turning the dasher one way or the other, the wider part of the tongue will be brought into alinement with the slot and thus allow the tongue to pass up through the slot to operative position. With my former device, shown in my aforesaid reissue patent, it was a somewhat slow process to insert the flat dasher-tongue into the straight slot, as the dasher-tongue had to be exactly alined with it before it would pass up therethrough, but with this centering device I find that the insertion of the tongue into the slot is rendered very easy. To permit the easy insertion of the tongue into the slot, I round off at 29 the upper edges of the tongue so as to thereby permit the tongue to readily slip into the slot when the dasher is turned so as to be in alinement therewith.

The tongue is also so shaped as to function as a tie-rod, i. e., a device for tying the bridge-member and the can together to thus prevent the bridge-member being upwardly sprung away from the can far enough to demesh or partly demesh the gears. With my former construction, I noticed that at times when the cream got very stiff, there would be a tendency to spring the bridge upwardly far enough to cause considerable tendency on the part of the gears to demesh while thus working under heavy resistance. To avoid this, I provide the dasher-tongue with a notch 30 in each of its side-edges, immediately below the round edge 29, thus forming a downwardly-facing shoulder. These notches are so placed in the length of the tongue that when the bridge is locked in position on the cam, their downwardly-facing shoulders will come opposite or very nearly opposite the top flat wall of the dome. As soon as the cream stiffens enough to offer any substantial resistance to the dasher, the dasher will be turned sufficiently to swing these downwardly-facing shoulders out of alinement with the slot in the dome, as shown in dotted lines in Fig. 3, thereby bringing the shoulders over upon the top face of the dome to thus afford an abutment against upward springing of the bridge independently of the cream-can-cover. It will be understood that the upper end of the dasher body abuts against the under side of the cover of the cream-can, as shown in Fig. 2.

The bracket 20 of the drive-shaft consists of a sheet-metal plate having a straight top-member 31 and vertical end-members 32 whose lower ends abut against the upper face of the bridge-plate. These lower ends are provided with ears 33 which extend through corresponding transverse slots 33' in the bridge-plate and are bent laterally and fastened to the underside of the bridge-member by brazing or otherwise. In this way, the bracket is rigidly affixed to the bridge-member. To provide a journal bearing for the shaft 19, the end-members 32 are provided with circular openings and the metal around these openings is bent inwardly to form journals of sufficient extension to properly support the shaft These bent-in edges 34 serve also to stiffen the bracket. This bracket is also provided with a similar shaft-opening in the top-wall, which opening is in alinement with a similar opening 35 in the bridge-plate. The purpose of these openings is shown in Fig. 9. They enable me to use this same bracket for a different type of gearing, to wit, a gearing consisting of a vertical shaft 36 journaled in said opening 35 and the corresponding opening in the bracket top-wall. In this type of gearing, the crank 37 is rotated in a horizontal direction, and the can is driven by a pair of straight-tooth gears 38 and 17'. In this way, I provide what may be termed a universal journal-bracket. Its advantage is that I may use it for either type of gearing and thus keep in stock but one kind of journal-bracket. This enables me to reduce the average stock of journal-brackets fifty per cent and yet have the same capacity to fill immediate orders for either type of freezer. It will be noted that by flanging the shaft-openings in the bracket, I strengthen the bracket sufficiently to compensate for the weakening due to cutting out the metal to form the shaft-holes.

The ice-can 12 is provided with an inwardly-curled bead 39 at its upper edge and also provided with the usual vertical lap-seam 40. In hingeing the bridge to the can-top, I arrange the hinge so as to straddle the vertical lap-seam 40, and I utilize as pintles for the hinge the curled, unwired beads 39. This hinge is formed by providing the end of the bridge-plate with a pair of ears 41 which are curled through circumferential slots 42 formed in the can body near its upper edge, one at either side of the can-seam 40. The ears 42 are curled around the curled bead 39, these beads forming, as stated, the pintles of the hinge. By thus arranging the hinge to straddle the seam 40, I utilize this seam to assist in providing a firm anchorage for the bridge-plate, this being the strongest part of the ice-can. This arrangement also enables me to use the non-wired beaded edge of the can as pintles for the hinge.

The latch of the bridge-plate is constructed of an integral depending tongue 43 bent downwardly from the free end of the bridge-plate, curving away from the can body. This tongue is slitted vertically and transversely to form a latch-tongue 44 which is bent inwardly to provide an upwardly-facing shoulder which when the latch is in locking position engages in a hole in the wall of the ice-can. The lower end of the latch-tongue is free, as will be observed, and the latch-tongue inclines downwardly and away from the body of the can, so that in locking the bridge it is simply necessary to press it downwardly until the latch-tongue snaps into the hole in the can. In unlocking, it is simply necessary to spring the tongue 43 outwardly far enough to release the shouldered latch-tongue from the hole in the can. In practice, I have found this latching device to be amply sufficient to lock the bridge against accidental disconnection while under heavy pressure, and I have also found that it maintains its efficiency as a latch, rendering it unnecessary to provide special pivoted members for locking the bridge in working position. By forming the latch from the body of the latch-tongue and arranging it in an opening in the tongue, it will be seen that the latch proper is operated without the operator touching or manipulating it directly, since it is disconnected not by taking hold of the latch itself but by taking hold of the latch-tongue 43.

The nature and scope of the invention having been thus indicated and its preferred embodiment having been specifically described, what is claimed as new is:

1. In an ice-cream freezer of the type set forth, a journal-bracket rigidly affixed to the bridge-plate and having a top-wall and two vertical walls, the top-wall being provided with an opening serving as a shaft-journal and said end-walls being provided with alined openings adapted to serve as shaft-journals, for the purpose set forth.

2. In an ice-cream freezer of the type set forth, a bridge-member provided with an upwardly-extending dome, a gear attached to the cream-can-cover and having a tubular extension fitting and working in said dome.

3. In an ice-cream freezer of the type set forth, the cream-can-cover being of sheet-metal and being provided with a central opening, a gear provided with a central opening and an annular interior flange, the metal around the opening in the can-cover being extended up into the gear and crimped down on said flange to thereby secure the gear to the can-cover.

4. In an ice-cream freezer of the type set forth, the cream-can being provided with a metal cover having a central opening for the passage of the anchoring tongue on the dasher, and a gear affixed to the cover around said opening, the cover being provided with indentations for receiving the teeth of the gear to thereby lock the gear against rotation on the cover.

5. In an ice-cream freezer of the class set forth, a bridge-plate provided with a slot for the reception of an upstanding anchoring-tongue on the dasher, said slot being enlarged midway its length and said dasher-tongue being provided with a reduced upper extremity adapted to enter said slot-enlargement to thereby assist in working the tongue up through the slot in the bridge.

6. In an ice-cream freezer of the class set forth, a swinging bridge-member having a longitudinal slot circularly enlarged midway its ends, a dasher having an upstanding anchoring-tongue adapted to extend up through said slot, said tongue being provided with a reduced tapering upper extremity adapted to enter said circular enlargement whether or not the tongue be in alinement with the straight part of the slot, for the purpose set forth.

7. In an ice-cream freezer of the type set forth, a bridge having an upstanding dome midway its ends, the top-wall of this dome being provided with a slot laterally enlarged midway its ends, a gear on the cream-can being provided with an upstanding flange working in said dome and the anchoring-tongue of the dasher being provided with a tapering upper extremity adapted to enter said enlarged part of the slot, for the purpose set forth.

8. In an ice-cream freezer of the class set forth, a bridge-member having a slot adapted to receive the flat upstanding anchoring-tongue of the dasher, said tongue being notched to form a downwardly-facing shoulder adapted during the churning action to overlie the top face of the bridge and thus lock the bridge to the cream-can-top.

9. In an ice-cream freezer of the type set forth, a bridge-member provided with an upwardly-extending dome circular in horizontal section and provided with an anchoring-slot for the flat dasher-tongue, and a gear on the cream-can-top up through which said tongue extends for engagement with said slot, this gear being provided with an upwardly-extending tubular part fitting and working within said dome to thereby form a journal for the upper end of the cream-can.

10. In an ice-cream freezer of the type set forth, a bridge-member provided with an upwardly-extending dome circular in horizontal section and provided with an anchoring-slot for the flat dasher-tongue, and a gear on the cream-can-top up through which said tongue extends for engagement with said slot, this gear being provided with an upwardly-extending tubular part fitting and working within said dome to thereby form a journal for the upper end of the cream-can, the upper side of the body-part of said gear having a bearing on the under side of the bridge-member to thereby hold the cream-can against upward movement.

In testimony whereof I hereunto affix my signature.

JOHN C. GIBBS.